(12) United States Patent
Oriet et al.

(10) Patent No.: US 7,971,918 B2
(45) Date of Patent: Jul. 5, 2011

(54) EXTENDABLE SLEEPER AND METHOD OF OPERATION

(75) Inventors: Leo P. Oriet, Rochester Hills, MI (US); Andre Bocancea, Windsor, CA (US)

(73) Assignee: Navistar Canada, Inc. (CA)

( * ) Notice: Subject to any disclaimer, the term of this patent is extended or adjusted under 35 U.S.C. 154(b) by 86 days.

(21) Appl. No.: 12/509,865

(22) Filed: Jul. 27, 2009

(65) Prior Publication Data

US 2011/0018298 A1 Jan. 27, 2011

(51) Int. Cl.
*B60P 3/34* (2006.01)
*B62D 35/00* (2006.01)

(52) U.S. Cl. ............ 296/26.09; 296/180.2; 296/190.02

(58) Field of Classification Search .................. 296/165, 296/26.09, 180.2, 180.3, 180.4, 190.02
See application file for complete search history.

(56) References Cited

U.S. PATENT DOCUMENTS

| | | | | |
|---|---|---|---|---|
| 3,834,752 | A * | 9/1974 | Cook et al. | 180/309 |
| 4,775,179 | A * | 10/1988 | Riggs | 296/180.2 |
| 5,658,038 | A | 8/1997 | Griffin | |
| 6,213,531 | B1 | 4/2001 | Corey et al. | |
| 6,276,736 | B1 * | 8/2001 | Cook et al. | 296/37.6 |
| 6,428,084 | B1 * | 8/2002 | Liss | 296/180.3 |
| 6,846,035 | B2 * | 1/2005 | Wong et al. | 296/180.1 |
| 6,932,419 | B1 * | 8/2005 | McCullough | 296/180.1 |
| 2004/0178663 | A1 * | 9/2004 | Whelan | 296/190.02 |
| 2007/0200390 | A1 * | 8/2007 | Lotarev et al. | 296/180.2 |
| 2008/0036173 | A1 | 2/2008 | Alguera | |
| 2009/0184539 | A1 * | 7/2009 | Pursley | 296/180.3 |
| 2010/0194143 | A1 * | 8/2010 | Perkins et al. | 296/180.2 |

OTHER PUBLICATIONS

Picture of truck, Aug. 7, 2008.

* cited by examiner

*Primary Examiner* — Jason S Morrow
(74) *Attorney, Agent, or Firm* — Jeffrey P. Calfa; Mark C. Bach; Gerald W. Askew

(57) ABSTRACT

Embodiments described herein relate to extendable sleepers for a tractor and methods of operating such a sleeper. In one embodiment, the tractor is connectable with a trailer. The trailer has a front surface. The extendable sleeper comprises a fixed portion disposed on the tractor, an extendable portion attached to the fixed portion, the extendable portion being movable between a retracted position and an extended position, and a mover operatively connected with the extendable portion for moving the extendable portion between a retracted position and an extended position. A control system is operatively connected with the mover for controlling operation of the mover. The control system operates in an extension mode where position of the extendable member is adjustable, a teach mode where a significant location of the extendable member is programmed into the control system, and an automatic mode where position of the extendable member is maintained.

2 Claims, 3 Drawing Sheets

EXTENDABLE SLEEPER AND METHOD OF OPERATION

BACKGROUND

Embodiments described herein relate generally to a sleeper for use on tractor-trailers and a method of operation of such a sleeper. More specifically, embodiments described herein relate to a sleeper for a tractor-trailer having an enclosed volume that is adjustable and a method of operating such a sleeper.

Air drag on a tractor-trailer reduces the fuel efficiency of the vehicle. One area where significant drag is created is at a gap located between the tractor and the trailer. This gap is typically 36 to 48 inches, depending on the vehicle and depending on the amount of loading on the trailer. The larger the gap, the more air that is trapped in the gap, and more drag is created on the vehicle.

To counteract the air turbulence effects on fuel efficiency, air deflectors are attached to the vehicle. The air deflectors may cause air to stream over the gap in a more controlled, less turbulent manner. Air deflectors may be heavy and costly, and may be installed in a fixed position. Changes in the air deflector configuration may be performed manually, which generally requires the use of hand tools. Fixed air deflectors offer limited improvements to air resistance because they do not close the entire gap. The fixed air deflectors may require a minimum gap measurement that exceeds the turning radius of the semi-trailer in relation to the tractor cab.

During travel of the vehicle, and particularly when negotiating a curved path, there is variation in the gap between the tractor cab and the trailer. To reduce air drag, the gap between the tractor and the trailer should be minimized under all travel conditions. However, if the fixed deflectors are extended too far and the gap is too small, the corners of the semi-trailer may strike and possibly encroach into a rear wall of the cab of the tractor when the vehicle is negotiating a curved path. Accordingly, fixed deflectors may not minimize air drag under all travel conditions.

It is known for tractor-trailers to be provided with enclosed compartments situated behind the driver's seat and accessible from the truck cab. These enclosed compartments are called sleepers. Sleepers may include one or more bunks, tables, chairs, storage closets and other furniture and amenities. The greater the length of the sleeper, the more room that is provided for the driver.

Length of the sleeper is dictated by the swing clearance area. However, the swing clearance area is occupied only when the tractor-trailer is in a turning configuration. When the tractor-trailer is in a substantially straight configuration, the swing clearance area may be unused and represent available free space.

SUMMARY

Embodiments disclosed herein relate to extendable sleepers for a tractor and methods of operating such a sleeper. In one embodiment, the tractor is connectable with a trailer. The trailer has a front surface. The extendable sleeper comprises a fixed portion disposed on the tractor, an extendable portion attached to the fixed portion, the extendable portion being movable between a retracted position and an extended position, and a mover operatively connected with the extendable portion for moving the extendable portion between a retracted position and an extended position. A control system is operatively connected with the mover for controlling operation of the mover. The control system operates in an extension mode where position of the extendable member is adjustable, a teach mode where a significant location of the extendable member is programmed into the control system, and an automatic mode where position of the extendable member is maintained.

DETAILED DESCRIPTION

Figure 1:
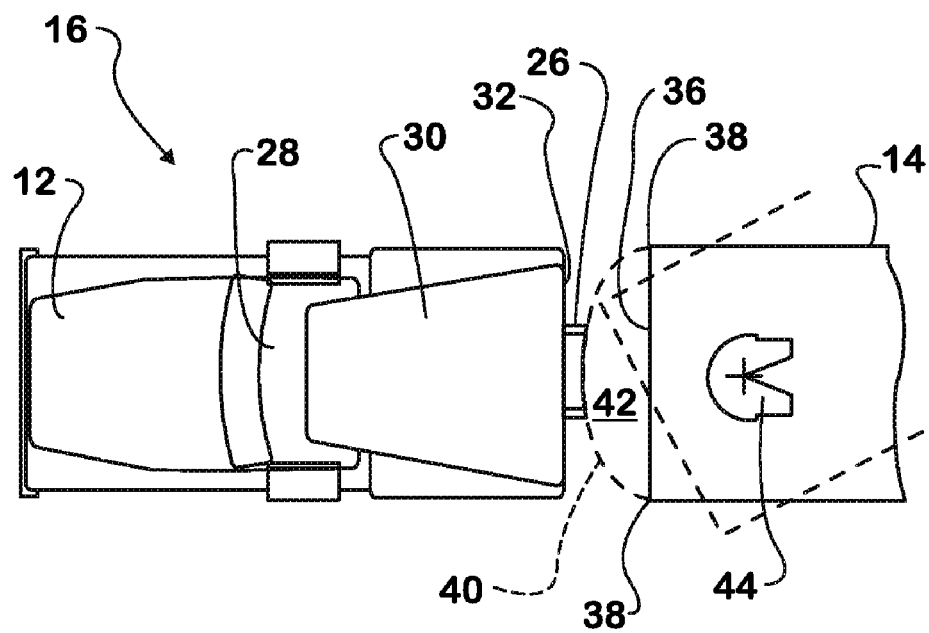
FIG. 1 is a top view of a tractor-trailer, with the trailer shown in a straight position (solid lines) and in a turning position (dotted lines).
Figure 2:
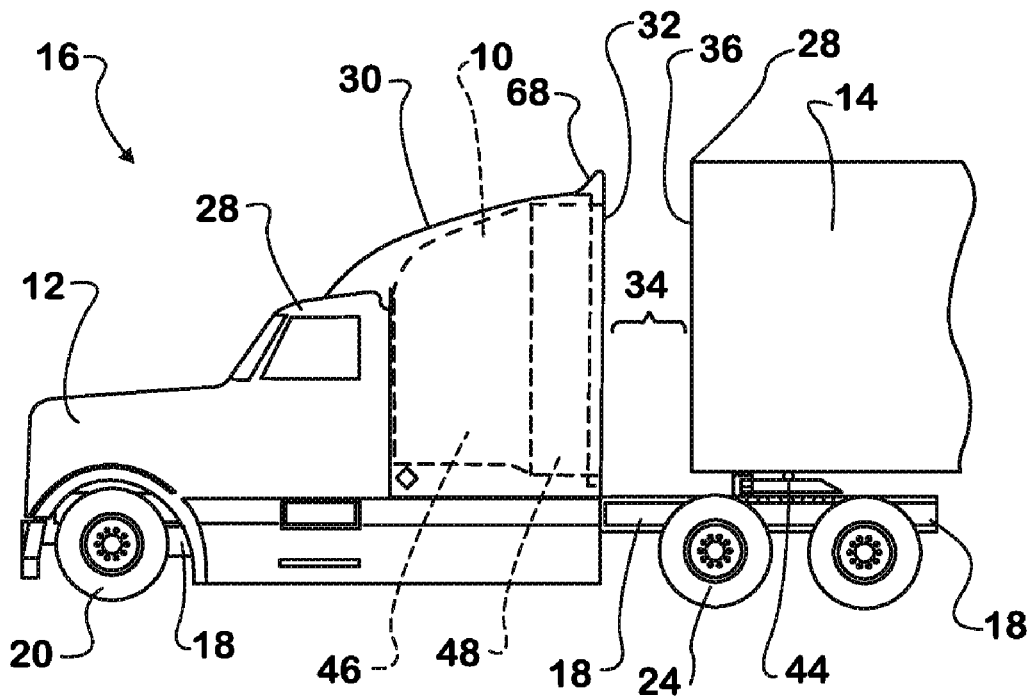
FIG. 2 is a side view of a tractor-trailer of FIG. 1.

Referring to FIG. 1 and FIG. 2, an extendable sleeper 10 is installed on a tractor 12 that is connected to a trailer 14 to form a tractor-trailer, designated generally at 16. The tractor-trailer 16 has a tractor frame 18 with front axle wheels 20, and rear axle wheels 24. The front of the trailer 14 sits on a fifth wheel 44, which transfers the front half of the trailer's weight to the tractor's frame 18 then to the rear axle wheels 24. The tractor 12 and the trailer 14 are mechanically connected through the fifth wheel 44. A cab 28 is located generally centrally on the frame rails 18. The tractor 12 has two parallel frame rails 18 that run from the front to the back of the tractor 12. The front axle 20 and the rear axles 24 are mechanically attached to the frame rails 18.

In the top view of FIG. 1 and the side view of FIG. 2, the extendable sleeper 10 is in a retracted position such that the sleeper 10 does not protrude from a rear edge 32 of the cab body 30 of the tractor 12. The extendable sleeper has an end 66 opposite to connection between the fixed portion and the extendable portion, i.e. opposite to an end of the sleeper attached to the cab body 30. As becomes clearer below, a gap 34 is located between the end 66 of the sleeper 10 and a front surface 36 of the semi-trailer 14.

When the tractor-trailer 16 negotiates a curve, there is relative movement of the trailer 14 with respect to the tractor 12. Front corners 38 of the trailer 14 move along an arc 40 toward the end 66 of the sleeper 10. The area (seen in FIG. 1 with solid line and dotted line arc) through which front corners 38 of the trailer 14 move is called the swing clearance area 42. The swing clearance area 42 relates to the fifth wheel 44, which receives and secures a kingpin mounted on the underside of the trailer 14 to provide pivotal connection between the tractor 12 and trailer 14. It is contemplated that the swing clearance area 42 can have shapes other than the illustrated D-shaped area, depending on shape of the front surface 36 of the trailer 14. Tractor 12 components are kept out of the swing clearance area 42 to reduce interference with or obstruction of movement of the trailer 14.

The length of some sleepers is limited by the swing clearance area 42. Sleepers have a length such that the rear edge 32 of the sleeper 10 is not positioned within the swing-clearance area 42 to prevent any possible contact between the sleeper and the trailer 14 when the tractor-trailer 16 is negotiating turns or curves. Thus, when the tractor-trailer 16 is in a substantially straight configuration, the space within the swing clearance area 42 is unused. The gap 34 created by this unused space is a source of aerodynamic wind drag for semi-tractor-trailers. Further, there may be overall vehicle length restrictions which prevent increasing the gap 34 between the tractor 12 and the trailer 14. In some embodiments, extendable sleepers may be in an extended position only when the tractor trailer 16 is not in motion.

In some embodiments, the sleeper 10 may be extendable and retractable when the tractor trailer 16 is either parked (stationary) or in transit (moving). The sleeper 10 has a first portion 46 and a second portion 48. The first portion 46 and the second portion 48 are capable of relative movement between a retracted position and an extended position. Relative movement of the first portion 46 and the second portion 48 correspondingly varies size of the gap 34 such that the gap 34 is larger when the first portion 46 and the second portion 48 are in the retracted position than the size of the gap 34 when the first portion 46 and the second portion 48 are in the expanded position. In one embodiment, the first portion 46 is disposed on and fixed to the cab body 30 of the tractor 12 and is attached to the cab 28 to provide the driver with access to the sleeper 10. In other embodiments, the second portion 48 can be fixed and the first portion 46 can be movable. The second portion 48 is attached to the first portion 46, and together, they form an enclosed variable volume having a substantially continuous seal to protect the driver/other occupants from environmental conditions such as temperature extremes, dust, dirt and noise. For the sake of clarity of understanding, the first portion 46 is referred to as the fixed portion 46 and the second portion 48 is referred to as the extended portion 48.

Figure 3:
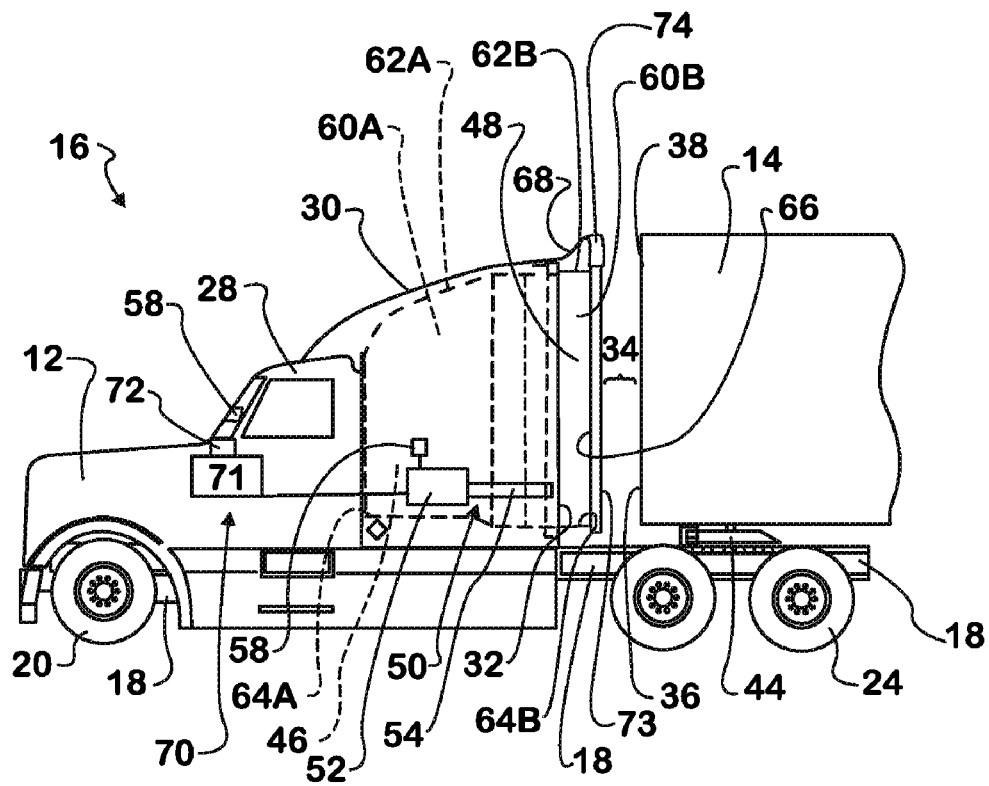
FIG. 3 is a side view of the tractor-trailer of FIG. 1 with an extendable sleeper in a retracted position.
Figure 4:
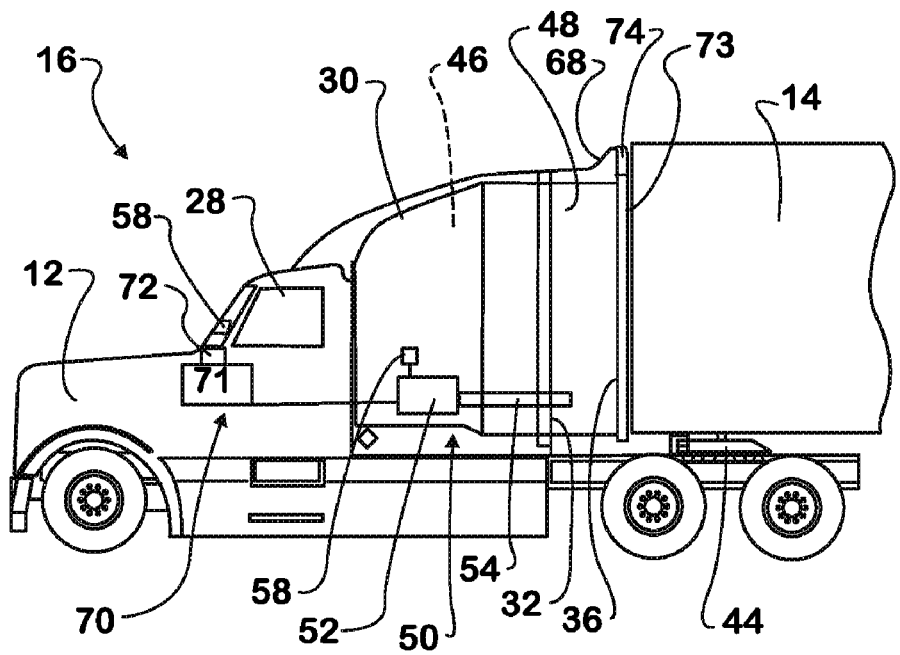
FIG. 4 is a side view of the tractor-trailer, the extendable sleeper of FIG. 3 in an extended position.

FIG. 3 and FIG. 4, the extendable portion 48 moves with respect to the fixed portion 46 towards the trailer 14 between the retracted position and the extended position. Movement of the extendable portion 48 of the sleeper 10 is effected by a mover or actuating means 50 operatively connected with the extendable portion 48. The means 50, such as a low pressure pneumatic actuator 52 having an actuator rod 54, moves or horizontally displaces the extendable portion 48 between the extended position and the retracted position. In one embodiment, low force precision linear bearings can be used to provide reduced friction, longitudinally sliding movement between the extended position and the retracted position. This construction provides pinch protection to reduce a likelihood of injury or product damage.

In some embodiments, the means 50 for moving the extendable portion 48 include powered actuators, such as high pressure pneumatic actuators, hydraulic actuators, electric motors, or any other suitable actuator or power assisted device known in the art. Further, the means 50 can be activated by the driver or occupant of the tractor-trailer 16 using a switch or button 58 located at an instrument panel in the cab, or at an exterior of the tractor-trailer (shown at both locations on FIG. 3 and FIG. 4).

Pressure of the pneumatic actuator 52 can be limited to a minimum force required to horizontally move the extendable portion 48 between the retracted poison and the extended position. It is contemplated that, in some embodiments, as little as about 10 lbs of force may be required to move the extendable portion 48.

In one embodiment, at least one of the fixed portion 46 and the extendable portion 48 has at least one of rigid side walls 60A, 60B, a rigid roof 62A, 62B and a rigid floor 64A, 64B. Other embodiments having different constructions are possible. It is contemplated that the extendable portion 48 may have exterior features such as a window, a skylight, a moon roof, and other features. In their interiors, the fixed portion 46 and/or the extendable portion 48 may have various features, such as furniture, appliances, fixtures and amenities. In one embodiment, a deflector 68 is located on the roof 62B of the extendable portion 48 to reduce air drag.

The extendable portion 48 has a height and width that are substantially equivalent to like dimensions of the front surface 36 of the trailer 14, such that when the extendable portion 48 is in the extended position, a large portion or substantially all of the gap 34 is occupied by the extendable portion 48 to reduce air drag. However it is contemplated that the extendable portion 48 may have various shapes and sizes and thus can occupy any desired portion of the gap 34.

A control system 70 is operatively connected with the mover 50 for controlling operation of the mover 50. The control system includes a computer 71 having memory that contains a program, adjusts, controls, and maintains position of extendable portion 48. Position of the extendable portion 48 can be chosen to reduce the gap 34 to both provide reduced air resistance and increased sleeper length.

With structure of embodiments being disclosed, some methods of operation of the embodiments will be discussed. Steps of the methods can be performed in any suitable manner. Steps of one method may be combined, in any appropriate manner, with steps of another method to arrive at yet additional methods. In one method, initially, the control system 70 is in a extension mode and position of the extendable portion 48 can be adjusted by the driver for any reason, e.g. different position of the extendable portion 48 for each trailer 14. It is contemplated that all variation in gaps 34 between any tractor 12 and any trailer 14 can be accommodated. When the tractor 12 is backed up and all hook-ups between the trailer 14 and the tractor 12 have been secured, the extendable portion 48 is placed in the retracted position. With the air brakes of the tractor 12 engaged, the control system 70 can be switched to a teach mode for programming the computer 71.

The driver or other operator triggers a switch or button 72 to move the extendable portion 48 towards the extended position until the extendable portion 48 is just shy, such as less than 2-3 inches, of the trailer 14, viz. a significant location of the extendable portion 48. This can be done with a person controlling movement of the extendable portion 48, or alternatively, with a gap sensor 74 operatively associated with the extendable portion 48 that can detect a distance between the extendable portion 48 and the trailer 14. Either way, movement of the extendable portion 48 is stopped at a pre-determined distance from the trailer 14. The selected position of the extendable portion 48 is locked by the control system 70, for example by releasing the switch or button 72. Releasing the switch or button 72 teaches the computer 71 where a maximum extension of the extendable portion 48 is located, representing the smallest attainable gap 34. In one embodiment, the smallest gap 34 is less than about 2-3 inches. However, other gap 34 measurements are possible.

Initial programming of the computer 71 and the control system 70 can be accomplished quickly without the need of tools. Once programmed, the maximum extension of the extendable portion 48 (and the minimum gap 34 measurement) is set, and the control system 70 is switched to an automatic extension mode.

Figure 5:
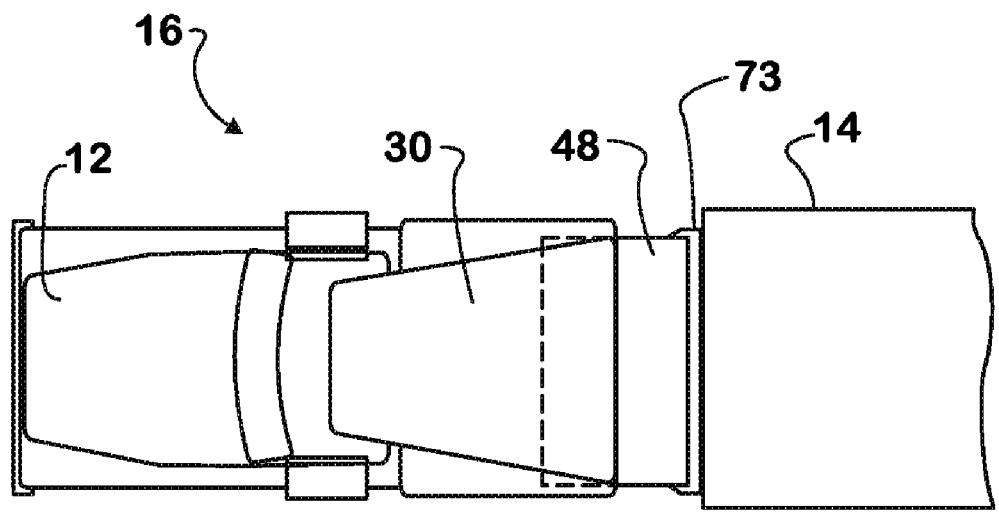
FIG. 5 is a top view of the tractor-trailer of FIG. 4.
Figure 6:
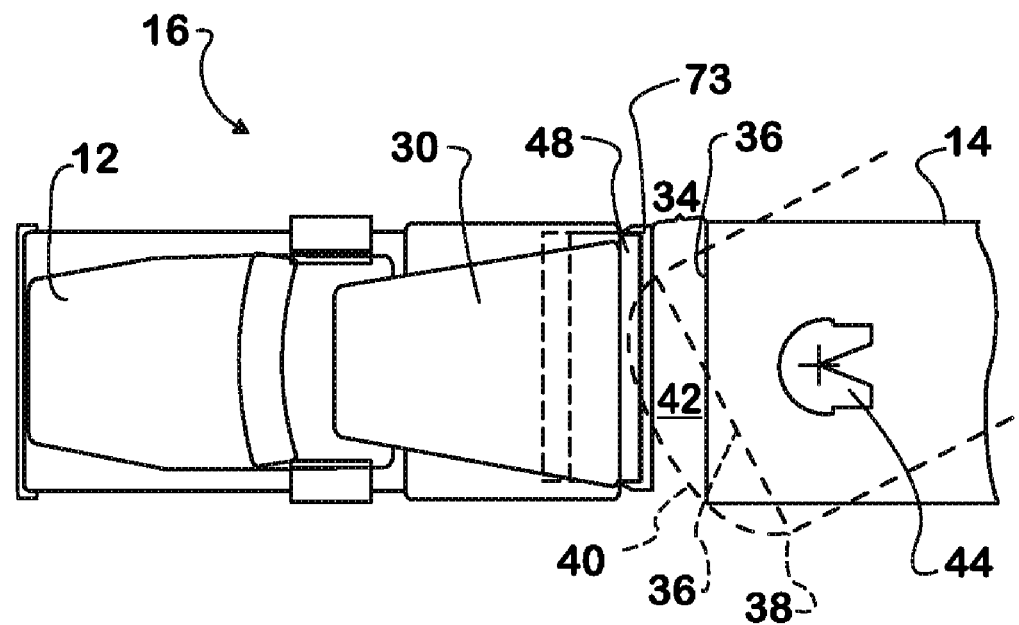
FIG. 6 is a top view of the tractor-trailer of FIG. 4 with the turning position shown in dotted lines.

Referring now to FIGS. 4-6, in the automatic extension mode, the computer 71 automatically maintains the minimum gap 34 measurement while the tractor-trailer 16 is either parked (stationary) or in transit (moving) by appropriately moving the extendable portion 48 between the retracted position and the extended position. The control system 70 automatically maintains the minimum gap 34 measurement. When the tractor-trailer 16 turns, and the tractor 12 and the trailer 14 are not substantially aligned, and, if necessary to maintain the minimum gap 34 measurement, the computer 71 automatically moves the extendable portion 48 between the extended position and the retracted position to substantially preserve the minimum gap 34 measurement. For instance, air pressure is reversed in the pneumatic actuator 52, moving the extendable portion 48 towards the fixed portion 46 of the sleeper 10 and out of the swing-clearance area 42. It is contemplated that the extendable portion 48 can be retracted either fully or partially. When the tractor 12 and the trailer 14 are substantially aligned, the extendable portion 48 may be extended to the maximum extension limit/smallest gap distance that was set by the control system 70 during the teach mode.

In one embodiment, in the automatic extension mode, a gap sensor 74 is used to sense the amount of gap 34 between the extendable portion 48 and the trailer 14. It is contemplated that the gap sensor 74 could be any appropriate sensing means, including a light screen, a magnetic proximity sensor, an ultrasonic sensor, or any other physical contact or non-contact gap sensing technology. In one embodiment, the gap sensor 74 measures and maintains a gap of about 2-3 inches or less. Non-contact gap sensors can be used to reduce road noise and physical contact wear and tear on the trailer 14. A grommet limit switch 73 can be used as well. The grommet limit switch 73, in one embodiment, could allow up to about 2-inches of tolerance between the trailer 14 and the extendable portion 48 prior to triggering a minimum gap fault or deviation during travel.

The gap sensor 74 and/or the grommet limit switch 73 substantially continuously monitors dimensions of the gap for any deviations from the minimum gap measurement. In the automatic extension mode, when the gap sensor 74 or the grommet limit switch 73 senses a deviation from the minimum gap measurement, the computer 71 causes automatic movement of the extendable portion 48 between the extended position and the retracted position to achieve the minimum gap measurement, and an alarm operatively associated with the fixed portion 46 is triggered to alert the driver of the deviation from the minimum gap 34 measurement and subsequent movement of the extendable portion 48. The computer 71 causes automatic movement of the extendable portion 48 by an incremental distance, such as about one inch in one embodiment, to reduce a likelihood of future minimum gap measurement deviations. It is contemplated that other distances of movement of the extendable portion 48 can be used. The program repeats and updates the computer 71 of the control system 70 each time the gap sensor 74 and/or the grommet limit switch 73 detects a minimum gap measurement deviation.

When the computer 71 receives information that the tractor-trailer is turning, the computer 71 causes automatic movement of the extendable portion 48 as appropriate. However, in the event that the trailer 14 comes in contact with the extendable portion 48, in one embodiment, a minimal force, for example about 10-lbs, could initiate movement of the extendable portion 48 towards the retracted position. The low friction linear bearings enable the extendable portion 48 to be moved relatively quickly. The extendable portion 48 laterally "floats" relative to the trailer, thereby avoiding possible pinch points.

In some embodiments, location of the swing clearance area 42 of the tractor-trailer 16 may be made available to the control system 70, such as when the control system 70 is in the teach mode. When in the teach mode, the extended position of the extendable portion 48 and a position of the extendable portion 48 that reaches a boundary of the swing clearance area 42 are entered into the computer 71 of the control system 70. When the control system 70 is in the extension mode, and the tractor-trailer 16 negotiates a curve, the extendable portion 48 is automatically moved to the position where the extendable portion 48 reaches a boundary of the swing clearance area 42. Thus, the extendable portion 48 is just outside of the swing clearance area 42. When the tractor-trailer 16 is straightened out, the extendable portion 48 is moved to the extended position.

Changes in relative positioning of the fixed portion 46 and the extendable portion 48 change volume enclosed within the sleeper 10, thereby corresponding adjusting room for the driver/other operator. Relative positioning of the fixed portion 46 and the extendable portion 48, i.e. moving the extendable portion 48 between the extended position and the retracted position, reduces air resistance of the tractor-trailer 16 by automatically maintaining dimensions of the gap 34 during operation of the tractor-trailer 16.

What is claimed is:

1. A method of operation of an extendable sleeper for a tractor, the tractor being connectable with a trailer, the trailer having a front surface, the extendable sleeper comprising a fixed portion disposed on the tractor, an extendable portion attached to the fixed portion, the extendable portion being movable between a retracted position and an extended position, the extendable portion having an end opposite to connection between the fixed portion and the extendable portion, a gap between the front surface of the trailer and the end of the extendable portion, a mover operatively connected with the extendable portion for moving the extendable portion between a retracted position and an extended position, and a control system operatively connected with the mover for controlling operation of the mover, the method comprising the steps of:
   determining a minimum gap measurement;
   substantially continuously monitoring dimensions of the gap; and
   automatically moving the extendable portion to maintain the minimum gap measurement.

2. The method as defined in claim 1 further comprising the step of:
   activating an alarm upon at least one of deviation of dimensions of the gap from the minimum gap measurement and movement of the extendable portion.

* * * * *